Oct. 25, 1938.  H. LANDSIEDEL  2,134,134
SHAVER
Filed Jan. 30, 1937  5 Sheets-Sheet 1
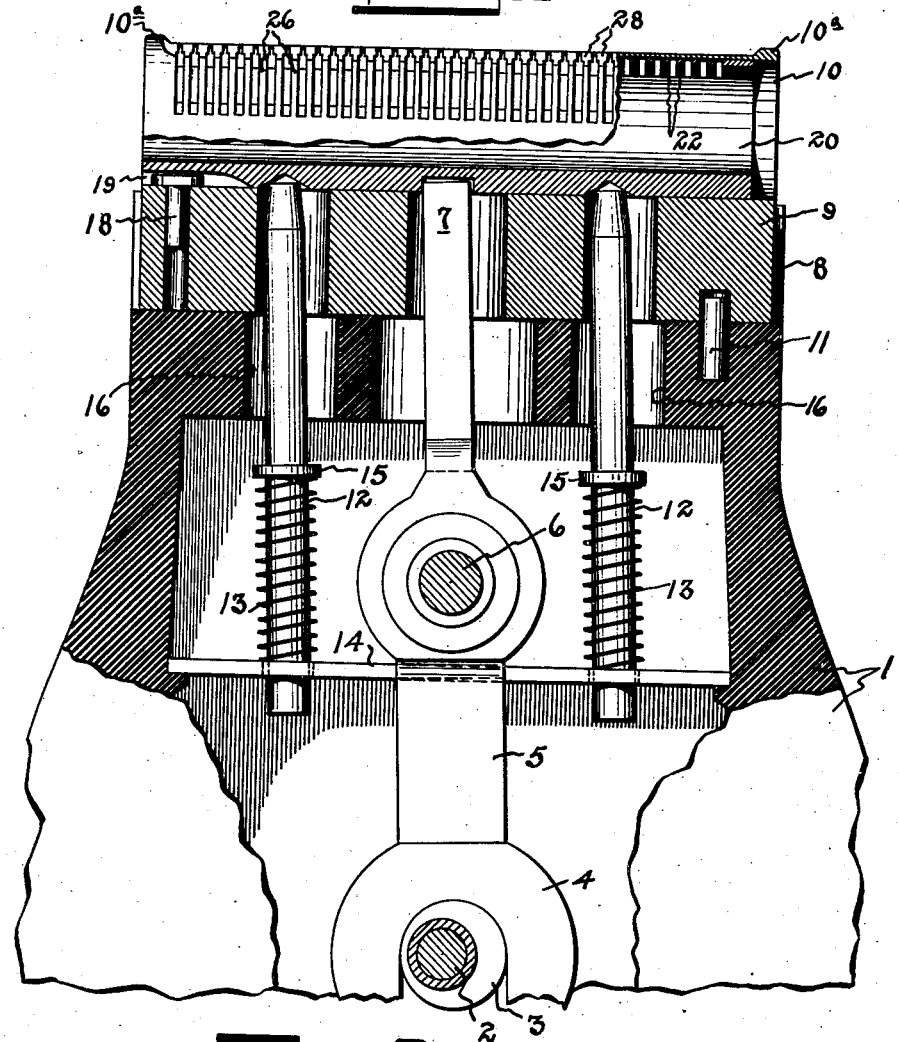
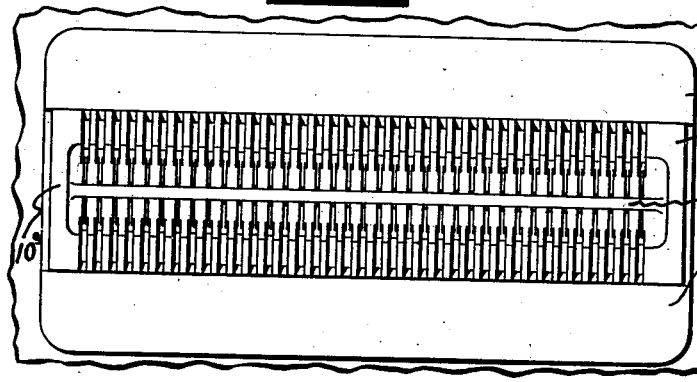
INVENTOR
Harry Landsiedel
BY Darby & Darby
ATTORNEYS Oct. 25, 1938.  H. LANDSIEDEL  2,134,134
SHAVER
Filed Jan. 30, 1937     5 Sheets-Sheet 2
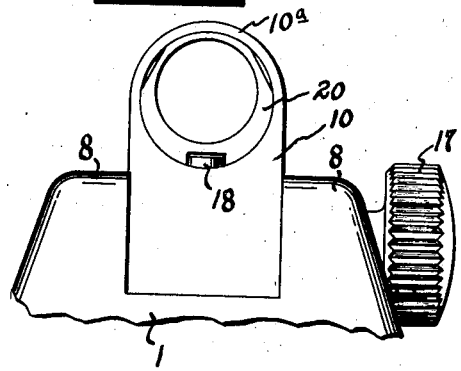
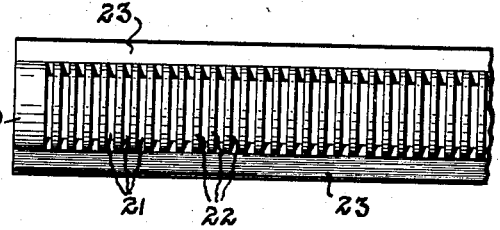
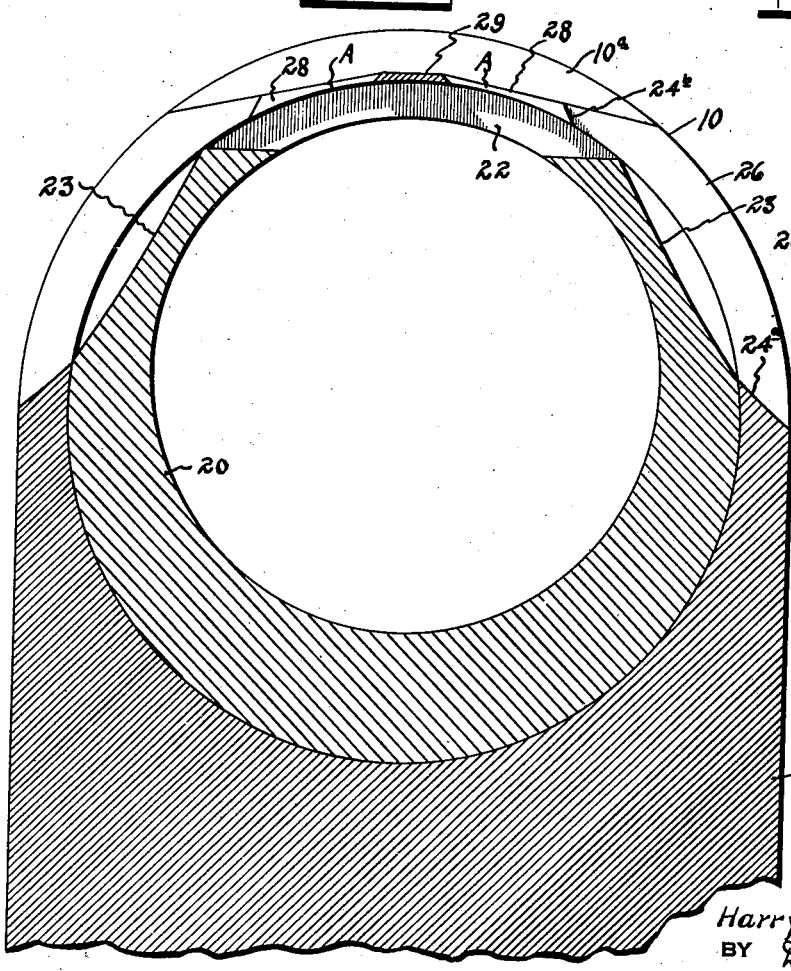
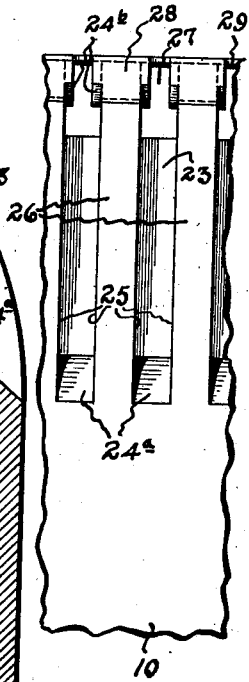
INVENTOR
Harry Landsiedel
BY Danby & Danby
ATTORNEYS

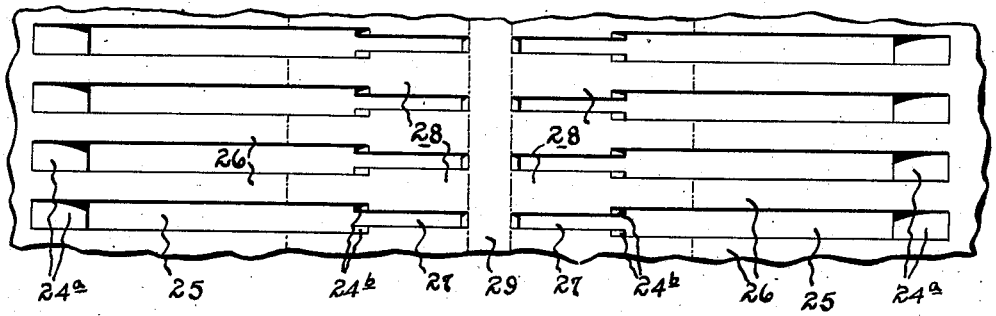# # 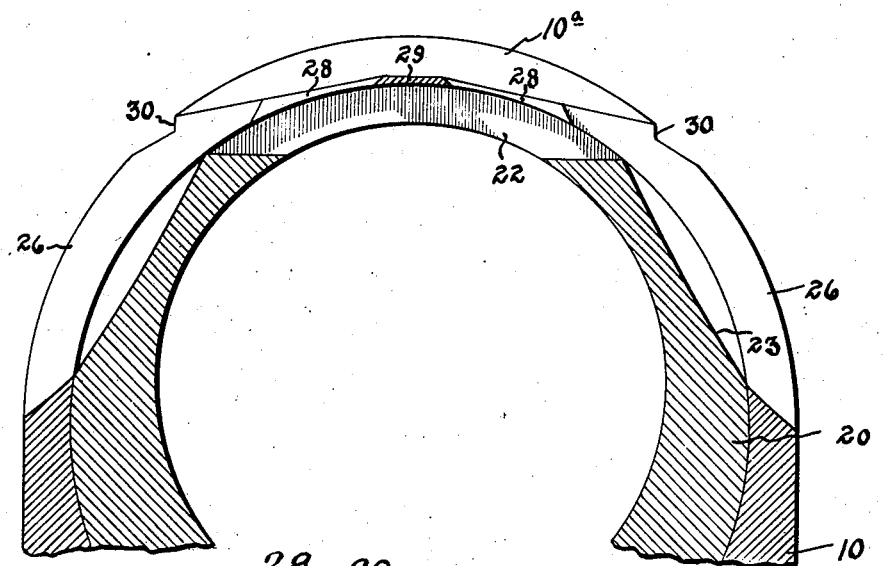 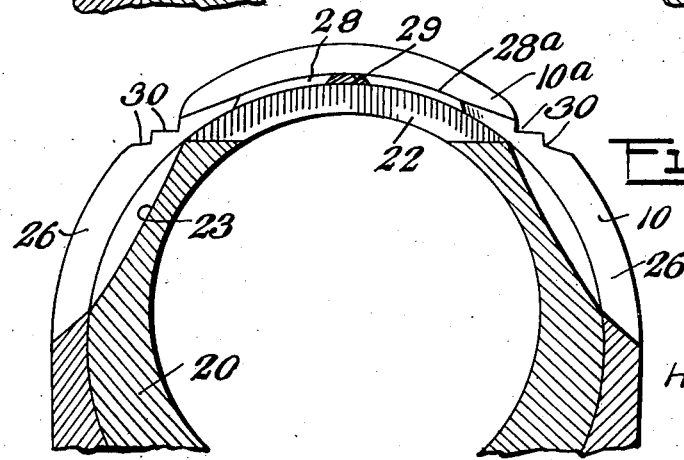

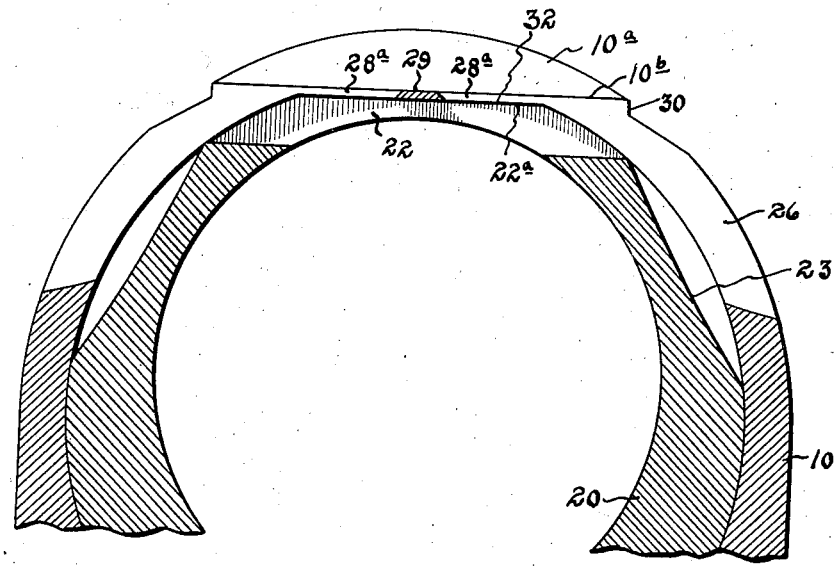
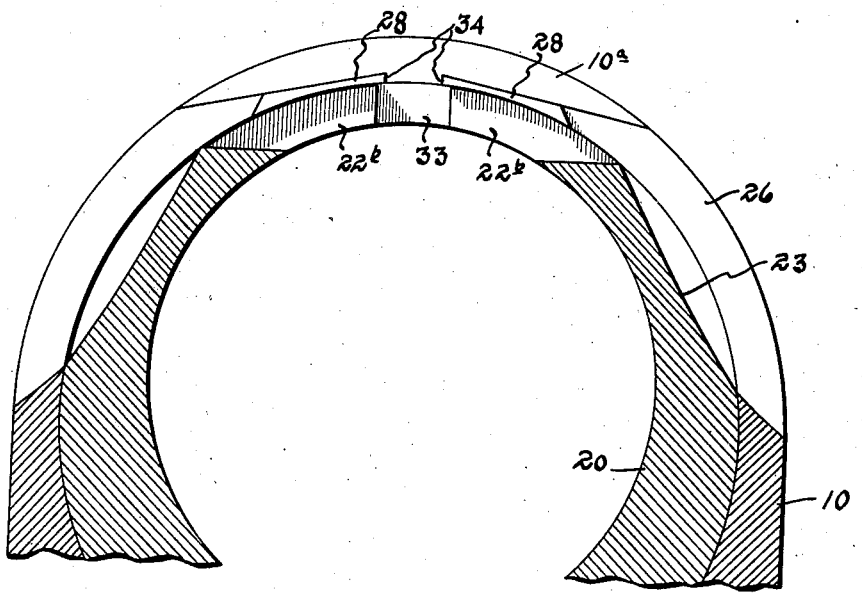

Oct. 25, 1938.    H. LANDSIEDEL    2,134,134
SHAVER
Filed Jan. 30, 1937    5 Sheets-Sheet 5

INVENTOR
Harry Landsiedel
BY Darby & Darby
ATTORNEYS.

Patented Oct. 25, 1938

2,134,134

UNITED STATES PATENT OFFICE 2,134,134

SHAVER

Harry Landsiedel, Wilton, Conn., assignor, by mesne assignments, to General Shaver Corporation, Bridgeport, Conn., a corporation of Delaware Application January 30, 1937, Serial No. 123,162

8 Claims. (Cl. 30—43)

This invention relates to improvements in shavers of the so-called dry type, that is, which are used without the use of water and/or soap.

The general object of the invention is to provide improvements in the construction of devices of this type as now known for the purpose of securing closer, smoother shaves in a rapid manner without irritation of the skin.

The specific objects of the invention will be better understood by a full and detailed description of the various forms of the structure comprising this invention as disclosed herein and will, therefore, be mentioned in connection with the specification of the details of construction and the operation thereof.

This invention resides substantially in the combination, construction, arrangement and relative location of parts, all as will be described in greater detail in the following specification.

In the accompanying drawings,

Figure 1 is a side elevational view of the upper or shaving head end of a type in accordance with this invention with parts of the motor housing and head broken away and parts shown in cross-section;

Figure 2 is a top plan view of the shaving head showing a portion of the motor housing;

Figure 3 is an end elevational view of the shaving head mounted in the end of the motor housing and the locking screw for securing the head therein;

Figure 4 is a top plan view of a portion of the inner cutter;

Figure 5 is an enlarged, transverse, cross-sectional view through the shaving head on a plane between a pair of cutter bars of both the outer shear plate and the inner cutter;

Figure 6 is a side elevational view of a portion of the structure of Figure 5;

Figure 7 is a developed top plan view of a portion of the outer shear plate;

Figure 8 is a view of a modified construction similar to that of Figure 5 but provided with a comb;

Figures 9 and 10 are cross-sectional views similar to Figure 5 of modified forms of shaving head;

Figure 17 is an enlarged, transverse, cross-sectional view of a still further modified form of shaving head.

Figure 11:
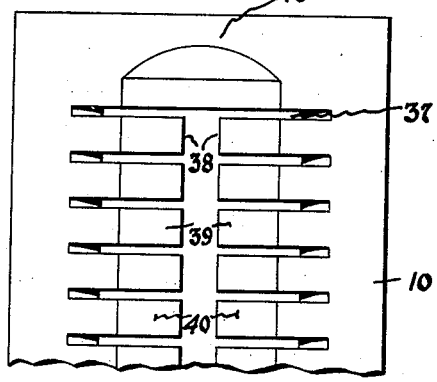
Figure 11 is a top plan view of a portion of the outer shear plate of the head of Figure 10.

Dry shavers as now commercially known in several forms have disadvantages which it is desirable to eliminate. In the common form of such shaver the construction of the cutting blades of the outer or shear plates is such as to render them mechanically weak, necessitating special cooperation of the inner cutters therewith to provide support which is frequently insufficient especially when the shaving heads are subjected to undue strains, shocks, jars, and the like. Frequently, shavers of the known type because of their construction have a tendency to chafe, burn, or irritate the skin of the user. The formation of the outer or shear plate is such as to necessitate an accurate relationship between the cutting face thereof and the skin in order to ensure a close shave, which relationship is difficult of attainment in actual use. There is a tendency for the hair clippings to get between the relatively movable parts, causing a binding action which tends to slow down the speed of movement of the inner cutter, which is undesirable. From a manufacturing viewpoint the constructions employed are expensive to reproduce in quantity.

As a general proposition, it may be stated that it is among the objects of this invention to eliminate these various undesirable features and to provide a rugged, strong, and efficient dry shaver which may be used without special skill and manufactured relatively easily with great accuracy in quantity production.

The form of structure shown in Figures 1 to 7, inclusive, is illustrated as comprising a motor housing 1, preferably but not necessarily constructed of a moulded material, within which is enclosed the operating motor. The motor is not shown in detail here since it forms no part of this invention. However, at 2 there is shown a motor driven shaft which has mounted thereon a driving cam 3 which cooperates with the bifurcated end 4 of a lever 5 pivotally mounted intermediate its ends upon a shaft 6 suitably mounted in the housing. The upper or driving end 7 of this shaft projects through an opening in the end wall of the housing for cooperative engagement with the movable or inner cutter 20 of the shaving head. The inner cutter is engaged by a pair of pins 12 which pass through the openings 16 in the housing 1 and openings in the bar 14 mounted in the housing. Springs 13 lie between the bar 14 and collars 15 formed on the pins 12.

The inner cutter is enclosed within a housing 10 which is shown as formed integral with a base plate or block 9 of suitable size and configuration to rest snugly in a groove on the end of the motor housing formed by the side wall projections 8. It is properly positionable within the groove or socket thus formed by a pin 11 mounted in the motor housing and projecting to engage in an aperture in the base 9. The inner cutter is provided with a notch into which the end 7 of the driving lever projects. The inner cutter is also provided with a longitudinally extending groove 19 at one end which is parallel to the axis of the cutter and receives the head of a guide pin 18 mounted in the base 9 so that the inner cutter may have reciprocal rectilinear motion only in the direction of its longitudinal axis.

The inner cutter is cylindrical on its outer surface and is provided with a longitudinal bore which is eccentric with respect to the outer surface to provide a relatively thinner wall at one side. This thinner wall is provided with a series of equally spaced slots 21 lying in planes at right angles to the axis of the cutter and extending a relatively short distance towards the center thereof. These slots are of the order of 0.015 thousandths of an inch wide in the direction of the axis of the cutter and form a plurality of equally spaced cutter bars 22 which are of substantially the same depth in an axial direction throughout their length although because of the eccentricity of the bore they are the narrowest at their longitudinal center. These bars 22 are also about 0.015 thousandths of an inch wide. The sides of the inner cutter 20 for a short distance adjacent the ends of the slots are ground away as indicated at 23.

The outer cutter or shear plate 10 is formed on the end of the base 9 and is substantially semi-circular in form and prior to the formation of the cutter bars thereon is of uniform wall thickness. A plurality of slots 25 are cut along the sides thereof by means, for example, of rotatable cutters or saws which form these slots terminating at 24a and 24b. The slots 25 are preferably about 0.015 thousandths of an inch wide and are equally spaced. They form a series of bars 26 which are preferably of the same order of width as these slots. With this construction about one-half the area of the side walls of the outer shear plate is removed, the other half remaining to form the bars 26. The flats of the semi-circular wall, except at the ends as indicated at 10a, are ground or otherwise finished flat on two planes which converge towards a common point, as is clear from Figure 5. The planes of these flat surfaces preferably lie at an angle of approximately 12° respectively with a horizontal plane tangent to their point of convergence. Another series of slots 27 are cut (they may be cut before the flats are ground) extending inwardly from the upper ends of the slots 25 from each side of the longitudinal center but terminating short thereof to form a solid longitudinal bar 29 which may be left peaked as would result from the grinding of the two flats or may be ground off flat to the desired thickness, as indicated in Figure 5. The slots 27 are of uniform width and are of the order of 0.008 thousandths of an inch wide. These slots form the actual cutting bars 28 which are of uniform width but are of varying depth in a radial direction. These cutting bars are the thinnest intermediate their ends and may be as thin as 0.0015 thousandths of an inch but preferably about 0.0025 thousandths of an inch. The thinnest portion of the bars has been indicated at A in Figure 5 and it will be seen that they are of increasing thickness towards both ends.

In some cases the longitudinal bar or land 29 may be ground thinner than indicated in Figure 5. It will be noted that for the dimensions given the width of the cutter bars 28 will be about 0.022 thousandths of an inch. This provides an extremely strong outer cutter bar both because of its width and its increasing depth towards both ends from the thinnest point with the result that at the thinnest point these bars may be made thinner without weakening the structure than is possible by any known practice. Even at the thickest portions, that is, at the outer ends of the bars 28, they are still thin enough to permit of actual shaving by initially clipping the hairs off so that they become gradually shorter until they approach the point A where they are clipped off substantially at the surface of the skin to provide an extremely smooth shave in a progressive cutting action. Thus, at the thickest portions these bars may be of the order of 0.004 thousandths of an inch, no thicker than the outer cutter bars of the present day dry shavers. The outer cutter bars are integral with the ends of the relatively strong bars 26 and the longitudinal bar 29 which further strengthens the structure so that no support for the outer cutter bars from the inner cutter is necessary under all shaving conditions encountered in actual use.

The cutting head assembly is locked in the end of the motor housing by means of a set screw 17 which engages the side of the base 9 in a known manner. The relief of the sides of the inner cutter at 23 reduces the frictional resistance to reciprocation of the inner cutter and provides a space into which the hairs may project through the slots 25 so that they may arrive at the bars 28 in an erect position.

This cutting head, it is believed, operates in a new manner in that when it is moved over the face in straight lines the hairs are progressively shortened until they are clipped off at the surface of the skin. The wide slots 25 provide an increased area which exposes the hair to the action of the cutter and the sides of the slots act to guide the hairs gradually to actual cutter bars. When the hairs arrive at the cutting area they first meet the outer or thicker ends of the bars 28 so that the tops thereof are progressively clipped off as the hairs move deeper into the openings toward the longitudinal bar 29. This is an advantage in that as the longer hairs are clipped off at the top so that their length is reduced they tend to stand up more rigidly, facilitating the final cutting thereof right at the surface of the skin. This construction is, therefore, efficient in shaving areas having relatively long hairs, which is not commonly true of known shavers. The cutting of the hairs into a plurality of short length clippings facilitates their passage through the cutter head and discharge therefrom, minimizing the danger of hair clippings clogging up in the hole of the cutter.

It will be apparent that the outer or shear plate presents a substantially smooth surface in contact with the skin, completely eliminating any tendency to irritate the skin. The increase in thickness of the cutter bars 28 from the thinnest point towards each end also ensures against burning and chafing the skin since any unit area of the skin is at the extremely thin points of the cutter bars for a minimum period of time, which is possible by reason, in part at least, of the progressive clipping off of the ends of the hairs as they approach the point A.

The provision of the two rows of cutter bars 28 on opposite sides of the longitudinal bar 29 and the grinding of the flats at a small angle to the horizontal along the tops thereof facilitates the operation of the shaver over the skin and particularly at the angular portions of the face. For example, in operating the shaver over the skin, beginning at the neck and moving upwardly towards the chin, the cutting is accomplished on one series of bars, for example the right hand bars of Figure 5, and as the shaver continues upwardly in its movement, without shifting the angle thereof with respect to the face as it moves around the sharp curve of the jawbone, the other series of bars come into action to complete the shaving operation on the area under the lower lip. It is, of course, apparent that this same action occurs in shaving upwardly from the neck around the jawbone to other parts of the face such as the cheeks. Thus, contrary to accepted practice today, it is not necessary to be continually conscious of the relative angular position of the shaver with respect to the plane of the particular area being operated upon. The two series of bars in relationship to the flats on their outer surfaces automatically take care of the variations in the contour of the face to ensure a close shave.

In cases where it may be desired to provide some combing action to initially engage the hairs and straighten them, a longitudinal notch may be ground along the sides of the outer shear plate as indicated at 30 to provide an abrupt wall which will act to comb the hairs out away from the skin. While this feature may be desirable in some instances, it has been found that it is not essential.

The construction, with the exception of the parts to be described, of the arrangement of Figure 9 is substantially like that of the previous forms described. The inner cutter 20 is the same but it is ground flat along the tops of the bars 22 as indicated by the reference character 22a. The outer shear plate 10 instead of having a completely circular passage therethrough is formed with its internal passage flat for a portion of the periphery, as indicated at 32, in a region coincident with the flat 22a. The top surface of the outer cutter intermediate the ends 10a are ground flat, as indicated by the line 10b, thereby forming at the cutting areas outer cutter bars 28a of uniform thickness which run into and are part of the longitudinal bar 29 as before. This construction can be used either with or without the comb 30.

The construction of Figure 10 is even more like that of Figure 5 in that the bars of the inner cutter are the same with the exception that they are divided intermediate their length by means of a longitudinal slot 33 which terminates short of the ends of the member 20, or, in other words, simply extends for a distance to cut all of the bars apart, so to speak, thereby forming pairs of cutter bars 22b which are cantilever bars in the sense that they are now supported only at their outer ends. The outer or shear plate 10 is likewise similar to that in Figure 5 except that the longitudinal bar 29 is removed, forming a longitudinal slot 34 leaving the ends of the outer cutter bars 28 free. An important feature of this arrangement is found in that the longitudinal slot 33 is wider than the longitudinal slot 34 so that the free ends of the bars 28 project over the free ends of the inner bars 22b. As before, the bars 28 are the thinnest intermediate their ends so that the free ends at the slot 34 are relatively thicker, which, in combination with the fact that the free ends of the bars 22b are back thereof, prevents burning and chafing of the skin. Burning and chafing of the skin is frequent with a longitudinally slotted shaver where the other bars do not project beyond the inner bars at the free ends or where the inner cutter oscillates as well as reciprocates and/or where the outer bars are of the same thinness throughout their length so that the ends of the inner bars come very close to the skin. The construction of Figure 10 may be provided with the comb 30 if desired. In the arrangement of Figure 10 it will be seen that the outer cutter bars are inherently and sufficiently strong enough so as not to need any support, thereby forming a rigid structure.

Figure 14:
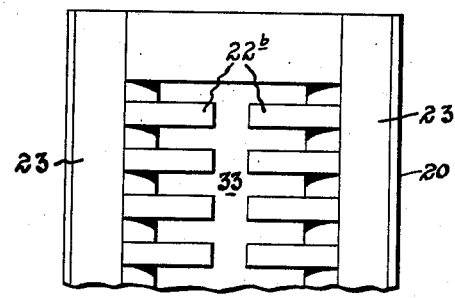
Figure 14 is a top plan view of a portion of the inner cutter.
Figure 12:
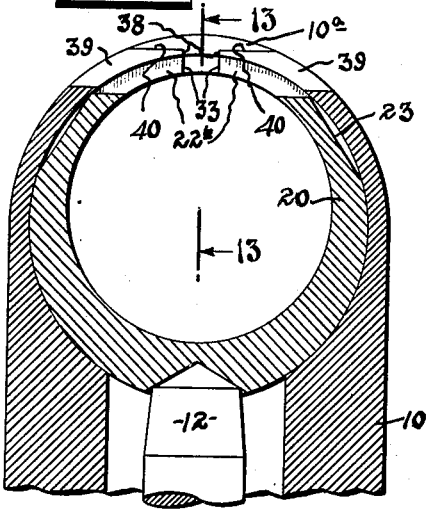
Figure 12 is a view of smaller size similar to Figure 10 showing the driving connection for the inner cutter.
Figure 15:
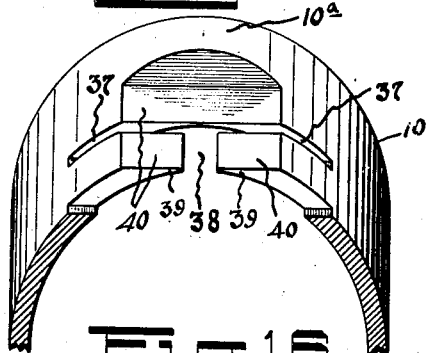
Figure 15 is a portion of the top of the outer shear plate in perspective.
Figure 16:
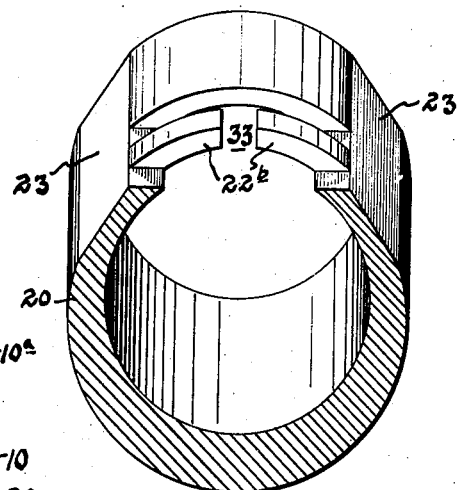
Figure 16 is a similar view of a portion of the inner cutter.
Figure 13:
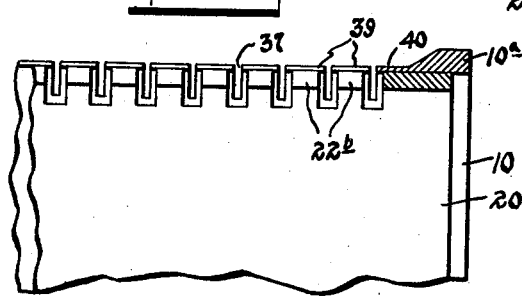
Figure 13 is a cross-sectional view taken on the line 13—13 of Figure 12.

Figures 11 to 16, inclusive, illustrate still another form in accordance with this invention. In this construction the inner cutter is the same as that employed in Figure 10 and Figures 13, 14 and 16 may be referred to as further illustrations of all of the details of construction of the inner cutter of Figure 10. The construction of this modification differs, however, from those previously described in the outer or shear plate. In this case a plurality of transversely extending slots 37 are provided extending all the way across the end face, as is clear from Figures 11 and 15. A flat is ground upon the top thereof and a longitudinal channel 38 is cut, thereby forming two series of spaced cutter bars 39 which are flat at the areas indicated at 40. This forms the outer cutter bars which are inherently and sufficiently strong so as not to need any additional support. With this arrangement the hairs may readily enter between the bars from either direction with respect to the ends thereof and are progressively cut off to the thinness or free ends thereof.

In the modification of Figure 17 the extremely thin cutting portions of the outer blades are longer than in the arrangement of Figure 5 for example. Thus the outer ends of the blades 28a instead of gradually increasing in thickness are ground away so that in a longitudinal direction these blades are curved and are of uniform thickness throughout a considerable portion of their cutting length. At their inner ends they join with the solid longitudinal bar portion 29 as before and at their outer ends they are of increasing thickness where they merge with the side walls. By means of this construction the bars 28a may be extremely thin and, for example, as thin as at the point A of the structure of Figure 5. This increases the effective cutting length of the bars for close shaving and while it produces a structure which is not as strong as that of Figure 5 the result is a shaver which operates more effectively and rapidly. The head shown in Figure 17 is provided with a pair of shallow longitudinal cuts 30 along each side to form a plurality of combs. These cuts in this construction, as well as in the previous constructions, are extremely shallow, say of the order of 5/1000ths of an inch deep so that the edges may be made sharp with little danger of irritation to the skin because of the extreme shallowness thereof. The skin may not enter below the sharp edges far enough to cause irritation and, therefore, the edges may be made sharp to enhance the function of picking up the hairs.

From the above description it will be apparent to those familiar with and skilled in the art that the various features of improvement comprising this invention in the several forms illustrated are all susceptible of modification without departure from the novel teachings thereof. I do not, therefore, desire to be strictly limited to the disclosure as given for purposes of illustration but rather to the scope of the claims granted me.

What I claim is:

1. A shaving head of the type described comprising a pair of substantially cylindrical members, one mounted within the other, means for reciprocating the inner member, said inner member having a plurality of slots to form a plurality of bars, said outer member being likewise slotted to form a plurality of cooperating bars and said inner member having flat surfaces formed on each side contiguous to the ends of the slots therein.

2. A shaving head of the type described comprising a pair of substantially cylindrical members, one mounted within the other, means for reciprocating the inner member, said inner member having a plurality of slots to form a plurality of bars, said outer member being likewise slotted to form a plurality of cooperating bars and said inner member having flat surfaces formed on each side contiguous to the ends of the slots therein, said outer member having a flat surface formed on the outer face thereof in the region of its bars.

3. An outer shear plate for a shaving head comprising a member having a curved wall, a plurality of slots formed in the curved wall, the upper ends of the slots being uniformly narrower than the lower ends, the upper face adjacent the narrow portion of the slots being formed into a flat surface at an acute angle to the normal plane at the point of intersection of the plane of the flat surface with the radius of the curved wall whereby the cutter bars in this region are progressively increased in thickness from a point intermediate the ends thereof, the outer face of the wall being longitudinally cut away to form a comb.

4. A shaving head comprising a pair of substantially cylindrical members, one fitting within the other, a portion of the wall of the outer member being thinner at the top and flat on both sides and having apertures to form cutter bars, the portion of the inner member adjacent the bars of the outer member being transversely slotted and flattened on its outer face for cooperation with the inner flat face of the outer member.

5. A shaving head comprising an outer transversely curved wall member having two sets of slots formed therein, the inner ends of the slots being closed by a longitudinally extending wall of solid metal, the bars formed by the slots being thicker at their outer ends, and an inner transversely slotted cutter operatively mounted to travel across the slots of the outer member, the outer face of the outer member being provided with a plurality of longitudinally extending shallow cuts adjacent the outer ends of the bars to form sharp combing edges.

6. A shaving head comprising an outer transversely curved wall member having two sets of slots formed therein, the inner ends of the slots being closed by a longitudinally extending wall of solid metal, the bars formed by the slots being thicker at their outer ends, and an inner transversely slotted cutter operatively mounted to travel across the slots of the outer member, the cutter bars of the outer member being of uniform thickness from their inner ends to the point at their outer ends where they increase in thickness, the outer face of the outer member being provided with a plurality of longitudinally extending shallow cuts adjacent the outer ends of the bars to form sharp combing edges.

7. A shaving implement, comprising a member having an outer semi-circular face and a cylindrical bore concentric with said face to form a curved wall, said wall having a plurality of transverse slots therein, each slot comprising two portions of uniform but different widths to form cutter bars, the outer faces of the cutter bars being formed in a flat plane intersecting the semi-circular face, and a cylindrical inner cutter reciprocally mounted in said bore and in turn having a bore and being transversely slotted to form a plurality of cutters.

8. A shaving implement, comprising a member having an outer semi-circular face and a cylindrical bore concentric with said face to form a curved wall, said wall having a plurality of transverse slots therein, each slot comprising two portions of uniform but different widths to form cutter bars, the outer faces of the cutter bars being formed in a flat plane intersecting the semi-circular face, an inner cutter reciprocally mounted in said bore and in turn having a cylindrical bore and being transversely slotted to form a plurality of cutters, and comb members formed on the outer faces of said cutter bars.

HARRY LANDSIEDEL.